Figure 1:
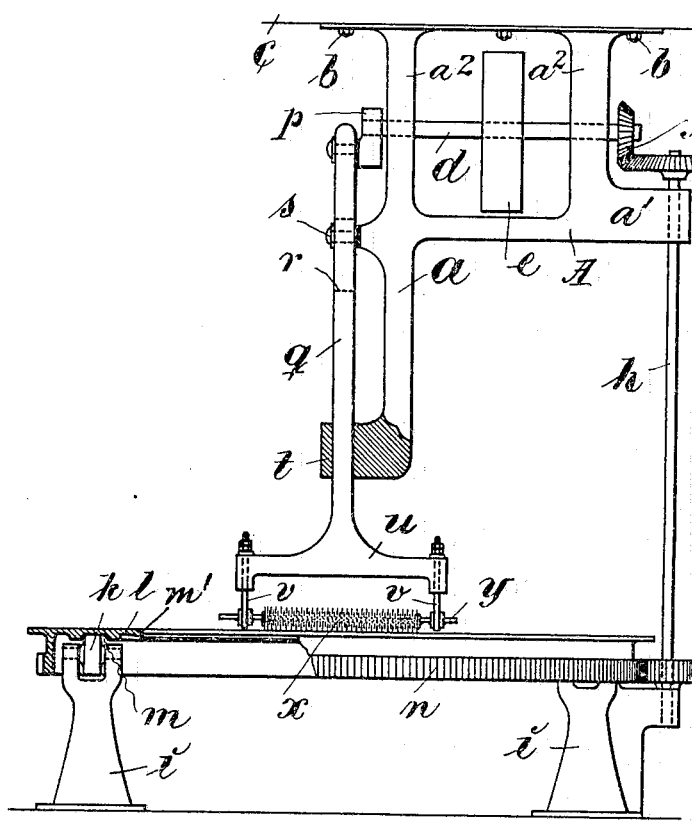

No. 769,444. PATENTED SEPT. 6, 1904.
C. A. MEURELL.
BREAD PRICKING MACHINE.
APPLICATION FILED MAY 5, 1904.
NO MODEL.

Witnesses:

Inventor,
Carl August Meurell.
by
Attys.

No. 769,444. Patented September 6, 1904.

UNITED STATES PATENT OFFICE.

CARL AUGUST MEURELL, OF SÄTER, SWEDEN.

BREAD-PRICKING MACHINE.

SPECIFICATION forming part of Letters Patent No. 769,444, dated September 6, 1904.

Application filed May 5, 1904. Serial No. 206,504. (No model.)

*To all whom it may concern:*

Be it known that I, CARL AUGUST MEURELL, a subject of the King of Sweden and Norway, residing at Säter, Sweden, (whose post-office address is Säter, Sweden,) have invented certain new and useful Improvements in Bread-Pricking Machines; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention has relation to a machine designed for use in the manufacture of bread, and more particularly to the manufacture of what is known as "Swedish health-bread," which is made in the form of thin cakes, the dough being spread out in a thin layer upon a flour-dusted support and then dusted over with flour, pricked, cut into cakes, the excess of flour previously dusted or scattered thereon removed, and then baked. In the manufacture of this particular kind of bread the proportions of water and flour or meal are of importance, as the greater the proportion of water within certain limits the crisper the bread. Hence the dough when made up is comparatively thin and very difficult to roll out into a thin cake of as nearly uniform thickness as possible, and this, as well as the other operations above referred to, have before my invention been effected by hand, involving a great deal of patient labor and time.

The means for spreading the dough into a thin layer of as nearly uniform thickness as possible, the means for pricking the layer of dough, and the means for slicing or cutting up said layer into cakes of suitable or desirable size for handling and packing, and even the means for removing the superfluous flour sprinkled on the layer of dough while being spread out may be combined in one machine in bakeries where the output is sufficiently large to admit of the use of a table of sufficient dimensions to provide the necessary space for the application of the various appliances. Where the output is small, it will be preferable to use separate apparatuses for performing the functions above referred to.

This invention relates more particularly to the mechanism for pricking the sheet of dough formed on an annular rotatable table by means such as shown and described in my application for patent filed of even date with this. I desire it, however, to be understood that I do not limit this invention to its use in the manufacture of the particular kind of bread hereinabove referred to, as it is evident that it may be used for the manufacture of any other kind of bread made from comparatively thin sheets of dough the pricking of which is desirable or required for well-known purposes.

Figure 2:
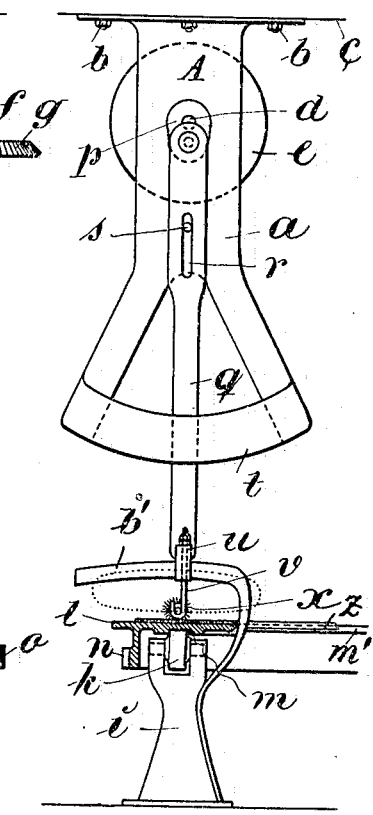
Figure 3:
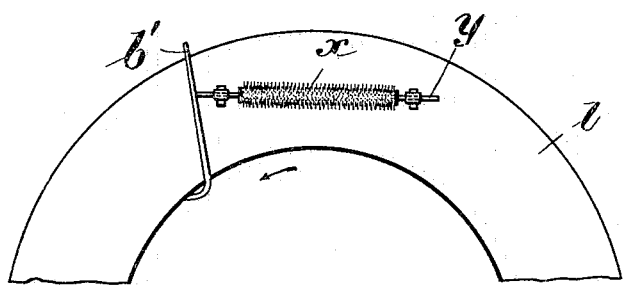

In the accompanying drawings, forming a part of this specification, Figure 1 is a side elevation, partly in section, illustrating my invention. Fig. 2 is an end elevation thereof, partly in section; and Fig. 3 is a fragmentary top plan view.

In the upper bifurcated ends of suitable standards $i$ are mounted friction-rollers $k$, that work in a circular recessed track $m$ on the under side of an annular table $l$, having an external peripheral toothed rim $n$ and preferably an internal downwardly-inclined or depressed narrow flange $m'$. In one of the standards $i$ is formed a bearing for the lower end of a vertical shaft $h$, which carries a pinion $o$ in gear with the toothed rim $n$ of table $l$, and at its upper end said shaft has its bearing in a lateral projection or arm $a'$ of an overhead support A, which may be secured by bolts $b$ to a ceiling or other overhead fixed body. Above the arm $a'$ the shaft $h$ carries a bevel-wheel $g$ in gear with a bevel-pinion $f$ on one end of a horizontal shaft $d$, which has its bearings in depending arms $a^2$ of the overhead frame, and said shaft $d$ carries a driving-pulley $e$ intermediate of frame-arms $a^2$ and at its opposite end an eccentric or crank $p$.

The frame or support A has a depending arm $a$, whose lower end is bifurcated, the arms of the bifurcated portion being connected to a slotted segment $t$, and from said frame projects a pin or bolt $s$, that passes through a longitudinal slot in a pendulous rod $q$, pivotally connected to the aforesaid crank $p$, said rod passing through the segmental slot in segment $t$ on frame-arm $a$. The rod $q$ terminates in a cross-head $u$, in the opposite ends of which are formed holes through which vertically-adjustable hanger-rods $v$ pass freely, the upper ends of the rods being screw-threaded for the reception of a nut and jam-nut. At the lower end of each rod is formed a bearing for the spindle $y$ of a spiked roller $x$, which spindle has endwise motion in said bearings.

When the overhead crank-shaft $d$ is rotated by power applied to pulley $e$, the rod $q$ is vibrated on an axis formed by the pin or bolt $s$ near the upper end of said rod, causing the cross-head $u$, with the spiked roller $x$, to describe the elliptical path indicated by dotted lines in Fig. 2, causing the roller to traverse the layer or sheet of dough on the table $l$ from the inner to the outer periphery of the latter, then upwardly to carry the roller out of contact with the dough, then back to the inner periphery of the table, and then downwardly to bring the roller again into contact with the dough, as will be readily understood.

Inasmuch as the roller is adjustable vertically in its bearings in the cross-head, the depth of the punctures can be regulated as desired; but inasmuch as the table rotates continuously the movement with it of the sheet of dough would be interrupted whenever the spiked roller $x$ was rolled across it. This would result in the tendency to tear the sheet of dough at one end of said roller and to crowd the dough against the opposite end of said roller. This is, however, effectually avoided by the endwise movement of the roller in its bearings. Thus when the roller rolls across the annular sheet of dough from the inner to the outer periphery of the table the spindle $y$ of said roller moves from right to left, Fig. 1, and in order to move said spindle back to a normal position I provide an abutment in the form of an arcuate plate $b'$, secured to one of the standards $i$ and projecting over the inner periphery and then obliquely across the table on the left end of the spindle into the path thereof from the outer to the inner periphery of the table $l$ above the same, said plate forcing or camming the spindle back from left to right, Fig. 3.

In order to prevent the sheet of dough on table $l$ from being dragged across the same by the spiked roller, I provide said table with the inner flange $m'$, above referred to, on which flange the inner edge $z$ of the sheet of dough lies at a more or less abrupt angle to the body of said sheet, Fig. 2, thus providing a frictional resistance which has been found sufficient to prevent the dragging of said sheet across the table $l$ by the pricking-roller $x$.

From the description of the construction of the dough-pricking machine its operation will be readily understood.

Having thus described my invention, what I claim as new therein, and desire to secure by Letters Patent, is—

1. The combination with a rotatable table and a revoluble pricking-roller; of means to move the roller across the path of the dough on said table, for the purpose set forth.

2. The combination with a rotatable table and a revoluble pricking-roller; of means to move the roller in one direction across the path of and in contact with the dough on said table and in a reverse direction out of contact with such dough, for the purpose set forth.

3. The combination with an annular rotatable table and a revoluble pricking-roller; of means to move the roller from one edge of the table to the other in contact with the dough thereon and to move said roller in a reverse direction out of contact with such dough, for the purpose set forth.

4. The combination with an annular rotatable table and a revoluble and vertically-movable pricking-roller; of means to move the roller from the inner to the outer edge of the table in contact with the dough thereon and in a reverse direction out of contact with the dough, for the purpose set forth.

5. The combination with an annular rotatable table provided with a downwardly-projecting flange on its inner periphery and a revoluble pricking-roller; of means to move the roller from the inner to the outer edge of said table in contact with the dough thereon and to move said roller in a reverse direction out of contact with such dough, for the purpose set forth.

6. The combination with a rotatable table and a revoluble and axially-movable pricking-roller; of means to move the roller in one direction across the path of and in contact with the dough, whereby the roller is shifted axially in one direction by the moving dough, and to move said roller in a reverse direction across the path of and out of contact with the dough, and means to shift the roller axially in a reverse direction during its movement last referred to, for the purpose set forth.

7. The combination with a rotatable table, a pricking-roller and a support therefor; of means to move the roller in a substantially elliptical path across the path of the dough on the table, for the purpose set forth.

8. The combination with an annular rotatable table provided with a downwardly-extending flange on its inner periphery, a pricking-roller and a support therefor; of means to move the roller in a substantially elliptical path across the path of the dough on the table, for the purpose set forth.

9. The combination with an annular rotatable table, a pricking-roller, and a support for and to which said roller is connected to have vertical and endwise motion; of means to move the roller in a substantially elliptical path across the path of the dough on the table from the inner to the outer edge of said table and back to the inner edge, and an abutment in the path of one end of the roller spindle or journal, operating to shift the roller axially during its movement from the outer to the inner edge of the table, for the purpose set forth.

10. The combination with a rotatable table and a pricking-roller; of mechanism to rotate the table and simultaneously move the pricking-roller in one direction across the path of and in contact with the dough thereon and to move said roller in a reverse direction across the path of and out of contact with the dough on the table, for the purpose set forth.

In testimony that I claim the foregoing as my invention I have signed my name in presence of two subscribing witnesses.

CARL AUGUST MEURELL.

Witnesses:
L. KALLENBERG,
HARRY FR. ALBIHN.